(12) United States Patent
Campbell et al.

(10) Patent No.: US 9,352,984 B2
(45) Date of Patent: May 31, 2016

(54) FLUID TREATMENT USING PLASMA TECHNOLOGY

(71) Applicant: DREXEL UNIVERSITY, Philadelphia, PA (US)

(72) Inventors: Christopher A. Campbell, Drexel Hill, PA (US); Young I. Cho, Cherry Hill, NJ (US); Alexander F. Gutsol, Lafayette, CA (US); Alexander Fridman, Philadelphia, PA (US); Frank T. Snyder, Schwenksville, PA (US); Vincent Szarko, Bensalem, PA (US); Erik Yelk, Gordonville, PA (US); Jesse Zanolini, Charlotte, NC (US); Victor N. Vasilets, Moscow (RU)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 14/640,432

(22) Filed: Mar. 6, 2015

(65) Prior Publication Data

US 2015/0274554 A1    Oct. 1, 2015

Related U.S. Application Data

(62) Division of application No. 12/304,394, filed as application No. PCT/US2007/071302 on Jun. 15, 2007, now Pat. No. 9,011,697.

(60) Provisional application No. 60/805,071, filed on Jun. 16, 2006.

(51) Int. Cl.
*H01F 38/00* (2006.01)
*C02F 1/46* (2006.01)
(Continued)

(52) U.S. Cl.
CPC ............. *C02F 1/4606* (2013.01); *C02F 1/4608* (2013.01); *C02F 1/46104* (2013.01);
(Continued)

(58) Field of Classification Search
CPC ........... A61L 2/14; C02F 1/46; C02F 1/4608; C02F 1/001; C02F 2103/023; C02F 2201/46165; C02F 2301/024; C02F 2201/4611; C02F 2303/04
USPC .......... 210/748.01–748.17, 748.19, 749, 753, 210/757, 758, 759, 760, 767, 806, 167.3, 210/167.31, 172.1, 172.2, 198.1, 209, 507; 422/1, 20–24, 28, 186, 186.03, 186.21, 422/186.22, 186.3, 243
See application file for complete search history.

(56) References Cited

U.S. PATENT DOCUMENTS

| | | | |
|---|---|---|---|
| 3,891,562 | A | 6/1975 | Mogensen et al. |
| 4,048,668 | A | 9/1977 | Von Bargen et al. |
| 4,265,747 | A | 5/1981 | Copa et al. |
| 6,054,097 | A | 4/2000 | Mass et al. |
| 6,749,759 | B2 | 6/2004 | Denes et al. |

(Continued)

FOREIGN PATENT DOCUMENTS

| | | |
|---|---|---|
| CN | 101844744 A | 9/2010 |
| KR | 10-2003-0015622 A | 2/2003 |
| KR | 10-2004-0103400 A | 12/2004 |

*Primary Examiner* — Walter D Griffin
*Assistant Examiner* — Cameron J Allen
(74) *Attorney, Agent, or Firm* — Baker & Hostetler LLP

(57) ABSTRACT

The invention is directed to apparatus for treating water by exposing the water to a pulsed plasma discharge. The pulsed plasma discharge is generated using a suitable electrode configuration to generate the plasma discharge in the fluid. Apparatus useful in the method may include a vessel, at least two electrodes for generating a plasma discharge in water, and a flow inlet and a flow outlet to allow water to be passed through the vessel. Also described is an in-line water treatment, where a pulsed plasma discharge is used in a pipe carrying moving water. Plasma based fluid treatment system may have many advantages in comparison to other treatment methods, such as very minimal maintenance, low operating power, and minimal pressure loss through the device.

14 Claims, 8 Drawing Sheets

(51) Int. Cl.
*C02F 1/48* (2006.01)
*C02F 1/00* (2006.01)
*C02F 1/461* (2006.01)
*C02F 103/02* (2006.01)

(52) U.S. Cl.
CPC .......... *C02F 1/48* (2013.01); *C02F 1/001* (2013.01); *C02F 2001/46152* (2013.01); *C02F 2103/023* (2013.01); *C02F 2201/4611* (2013.01); *C02F 2201/4617* (2013.01); *C02F 2201/46165* (2013.01); *C02F 2201/46175* (2013.01); *C02F 2301/024* (2013.01); *C02F 2301/026* (2013.01); *C02F 2303/04* (2013.01)

(56) References Cited

U.S. PATENT DOCUMENTS

| | | | |
|---|---|---|---|
| 7,658,891 | B1 | 2/2010 | Barnes |
| 7,695,675 | B2 | 4/2010 | Kaiser et al. |
| 2003/0222586 | A1 | 12/2003 | Brooks et al. |
| 2004/0033176 | A1* | 2/2004 | Lee et al. .................. 422/186 |
| 2004/0168905 | A1 | 9/2004 | Duvinage et al. |
| 2006/0032822 | A1 | 2/2006 | Banerjee |
| 2006/0257280 | A1 | 11/2006 | Hammerstrom et al. |
| 2006/0266637 | A1 | 11/2006 | Gutsol et al. |
| 2007/0186474 | A1 | 8/2007 | Rabovitser et al. |
| 2007/0272543 | A1 | 11/2007 | Burlica et al. |
| 2009/0206721 | A1 | 8/2009 | Foret |

\* cited by examiner

FIG. 1A  FIG. 1B
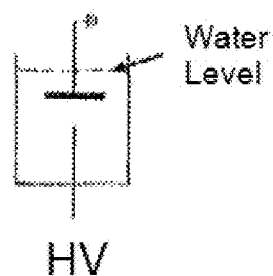
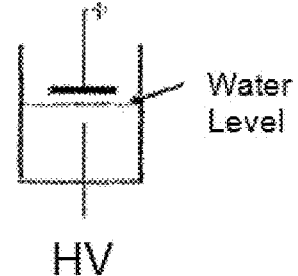
FIG. 1C  FIG. 1D  FIG. 1E
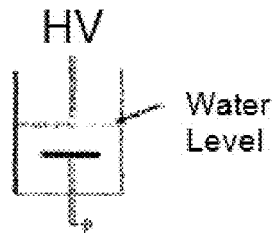
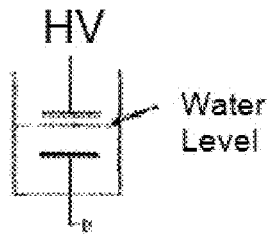
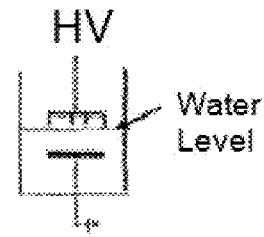
FIG. 1F  FIG. 1G
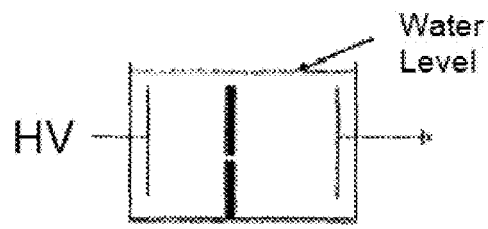
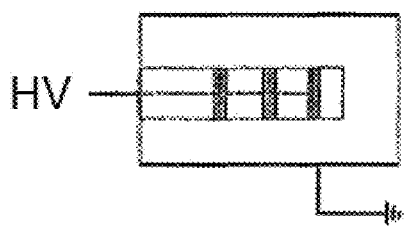

FLUID TREATMENT USING PLASMA TECHNOLOGY

CROSS REFERENCE TO RELATED APPLICATIONS

This application is a divisional of U.S. patent application Ser. No. 12/304,394, filed Dec. 29, 2009, which is the National Stage of International Application No. PCT/US2007/071302 filed Jun. 15, 2007, which claims the benefit of U.S. Provisional Application No. 60/805,071, filed Jun. 16, 2006, the entire disclosure of each application is incorporated by reference herein.

TECHNICAL FIELD

The invention relates generally to fluid treatment technology. More specifically, the present invention relates to methods and apparatus for treatment of fluids such as water to reduce the content of live microorganisms using plasma technology.

DESCRIPTION OF RELATED TECHNOLOGY

The rising concern associated with the availability of potable water is an issue that has paralleled the continual increase in global population and international development. From a global perspective, an estimated 1.1 billion people are unable to acquire safe drinking water. One cause of contamination is the presence of untreated bacteria and viruses (collectively termed microorganisms) within the water. As estimated by the Environmental Protection Agency (EPA), nearly thirty-five percent of all deaths in developing countries are related directly to contaminated water. In addition, growing populations have implemented individual water collection, water storage and water distribution units to support their water needs, including rooftop tanks and surface water collection systems. The non-circulatory nature of these units is conducive to stagnation and increased bacterial growth, and contributes to unsafe water consumption. Well water systems are also employed to obtain safe drinking water, though the water tables that support these systems are not impervious to contamination.

Currently, there are many available methods of water treatment and decontamination, including chlorination, ozonation, UV lamps, in-line filters, and pulsed electric fields. With regard to water disinfection, chlorine remains both an accepted and widely employed method of treatment. Chlorine is used to treat drinking water supplies due to its ease of use and associated efficiency with regard to inactivating microorganisms. Regardless of system size, it is one of the least expensive disinfection methods; however, its toxicity requires strict adherence to accepted concentration levels. An excess of chlorine in a drinking water supply could render the water toxic to humans. Unwanted byproducts resulting from the interaction of chlorine with other chemicals present in the water can prove corrosive and deteriorative to the system. In addition, because a chlorination based system must be continually replenished, the storage and transportation of chlorine becomes a significant hazard.

Ozonation is a growing method of water treatment; it is a process that involves ozone generation by plasma in air. The resultant ozone is bubbled into a contaminated solution through the primary mechanism of mass transport. The ozone is chemically active and is capable of efficiently inactivating microorganisms at a level comparable to chlorine. Achieving a four-log reduction in microorganisms at 20 degrees Celsius with an ozone concentration of 0.16 milligrams per Liter (mg/L) requires an exposure time of 0.1 minutes. At higher temperatures and pH levels, ozone tends to rapidly decay and requires more exposure time. Due to the corrosive and toxic nature of ozone, ozonation systems require a high level of maintenance. The efficiency is compromised by the energy that is lost during mass transport, and because ozonation requires a significant initial capital investment.

An alternative point-of-use water treatment method employs UV radiation through UV lamps. The dosage required for successful deactivation of a microorganism depends upon its structure. For example, *E. coli* requires a dosage of 3,000 microwatt-seconds per cubic centimeter ($\mu Ws/cm^3$) for a 90 percent reduction. The life of a UV lamp is relatively short and thus the lamp requires constant replacement. Also, the effectiveness of this treatment method is compromised by several additional factors, including biological shielding and chemical or biological film buildup on the lamp. An advantage of this system is that the temperature and pH of the treated water are not significantly affected and no undesirable by-products are created.

In-line filters are commonly used to remove undesirable substances from water. Many different types are commercially available, including carbon filters, micro-filters, and reverse osmosis filters. The key advantage to these filters is that they require no power to operate, but there are two significant drawbacks to this method. First, though these filters are capable of preventing microorganisms from passing through the system, they are incapable of inactivating them leading to bacterial growth in the filters. Secondly, the small pores needed to trap microorganisms also inhibit the flow, resulting in pressure loss across the filter. Significant pressure losses in the system require the use of larger pumps in the system.

Pulsed electric field technology is also employed to treat water. Since the electric field associated with this technology is not strong enough to initiate breakdown, there is no resulting discharge. The mechanism of electroporation caused by the electric fields effectively deactivates microorganisms. In electroporation, the electric field creates holes in the membrane of the cell, causing an influx of water and cell explosion. At nominal conditions, the energy expense for a two-log reduction of microorganisms is approximately 30 Joules per cubic centimeter ($J/cm^3$).

The commercialization of these water treatment methods are not, however, without deficiencies. With regard to human consumption, chemical treatments such as chlorination can render potable water toxic. The effectiveness of ultraviolet radiation and ozone injection largely depends upon adherence to regimented maintenance schedules. Therefore improvements in water treatment methods, especially point-of-use water treatment systems, are needed.

SUMMARY

In a first aspect, the present invention relates to a method for the treatment of fluid including the step of exposing the fluid to a pulsed plasma discharge. The pulsed plasma discharge will be generated using a suitable electrode configuration to generate the plasma discharge in the fluid.

In a second aspect, the present invention relates to various apparatus useful in the method of the present invention. The apparatus may include a vessel, at least two electrodes for generating a plasma discharge in fluid, and a flow inlet and a flow outlet to allow fluid to be passed through the vessel.

In a third aspect, the present invention relates to in-line fluid treatment, where a pulsed plasma discharge is used in a pipe carrying moving fluid.

A plasma based fluid treatment system may have many advantages in comparison to other treatment methods, such as very minimal maintenance, low operating power, and minimal pressure loss through the device. The device of the present invention can treat fluid such as water, for example, at a flow rate of 5 gallons per minute while consuming only 120-150 Watts of electrical power. Therefore a plasma based design solution will be advantageous for the design and implementation of fluid treatment systems and particularly water treatment systems such as point-of-use treatment systems.

BRIEF DESCRIPTION OF THE DRAWINGS

FIG. 1A is a schematic representation of a point-to-plane liquid phase corona vessel.

FIG. 1B is a schematic representation of a point-to-plane liquid phase corona vessel with an air gap.

FIG. 1C is a schematic representation of a single point-to-plane glow discharge vessel.

FIG. 1D is a schematic representation of a plane-to-plane glow discharge vessel.

FIG. 1E is a schematic representation of a multiple point-to-plane glow discharge vessel.

FIG. 1F is a schematic representation of a pinhole vessel.

FIG. 1G is a schematic representation of a ring electrode vessel.

DETAILED DESCRIPTION OF PREFERRED EMBODIMENTS

Figure 1H:
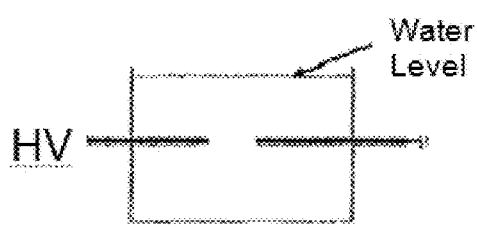
FIG. 1H is a schematic representation of a point-to-point arc vessel.
Figure 1I:
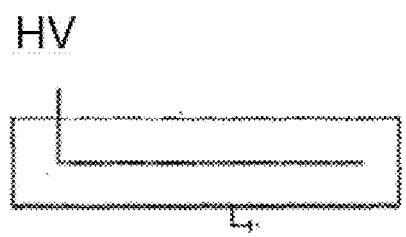
FIG. 1I is a schematic representation of a wire-cylinder vessel.
Figure 1J:
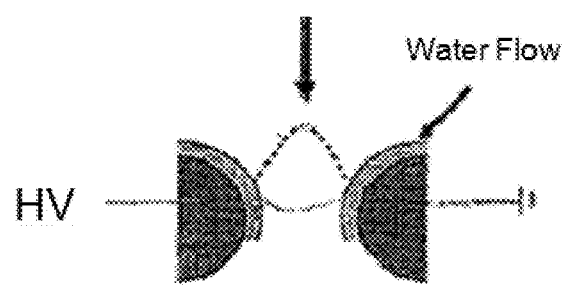
FIG. 1J is a schematic representation of a gliding arc with water film.
Figure 1K:
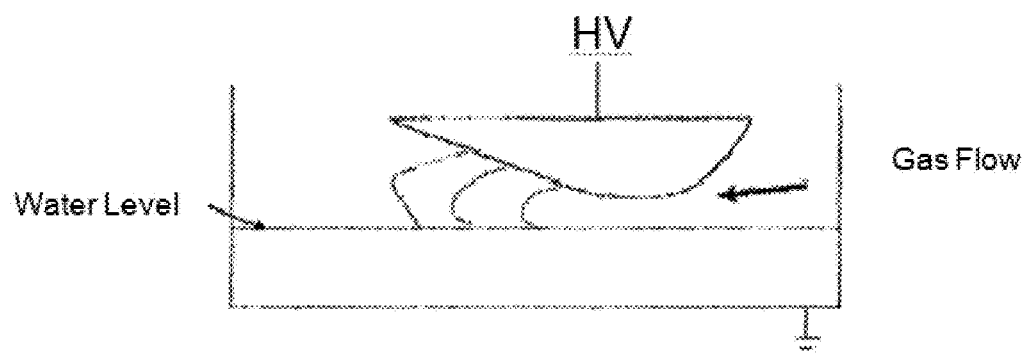
FIG. 1K is a schematic representation of a gliding arc to water surface.

The present invention relates to fluid treatment methods and apparatus for carrying out the methods. The invention has been illustrated for water treatment systems, but may be applicable to treatment of other fluids as well, as long as microbial contamination is an issue.

In one embodiment, the present invention provides a method and device which can be employed as a point-of-use water treatment system suitable for household use that will inactivate waterborne microorganisms commonly found in drinking water through the implementation of plasma technology. The design will be capable of accommodating the demands associated with daily household water consumption. The design may also be integrated into most household water delivery systems. Also, the design may be operated in accordance with drinking water standards developed and employed by the Environmental Protection Agency (refer to EPA 822-R-04-005).

The primary method of inactivating microorganisms in fluids such as water in accordance with the present invention involves a process of exposing the fluid to a pulsed plasma discharge. The pulsed plasma discharge will be generated using a suitable electrode configuration to generate the plasma discharge. A vessel may be employed to ensure thorough mixing of the fluid.

Plasma is an electrically neutral medium consisting of electrons, positive and negative ions, and neutral particles. When an electric field between two electrodes exceeds the breakdown voltage of the medium, the medium is ionized creating a plasma channel The byproducts obtained from such a breakdown prove to be quite efficient in the inactivation of microorganisms. There are three primary byproducts of breakdown in fluid that are useful for treatment of fluids such as water: ultraviolet radiation (VUV and UV radiation), active chemical species and shock waves.

The photons emitted by the UV radiation that is generated directly by the plasma discharge, can have two possible effects on a microorganism. One effect is through direct collision with the contaminant causing mutation of the bacterial DNA. This prevents proper cellular reproduction and effectively inactivates the microorganism. Alternatively, the photons can provide the necessary energy to ionize or dissociate water molecules, thus generating active chemical species. Both mechanisms result in deactivation of viable microorganisms.

The second useful byproduct of a plasma discharge is the production of active chemical species. The electrons forming in the plasma discharge are capable of converting surrounding water molecules into active radical species due to their high energy levels. An example of this conversion process would be the production of lethal hydroxyl radicals. The microorganisms are effectively inactivated when oxidized through contact with active radicals.

The third useful byproduct of the plasma discharge is shock waves. As discharges form and collapse within the vessel, they generate pressure waves. These pressure waves can have one of two effects. First, they can directly interact with the microorganism causing it to explode. Alternatively, the pressure waves can dissociate microorganism colonies within the liquid, thus increasing their exposure to the other inactivation mechanisms discussed above.

Many different types of electrode configurations can be used to generate the plasma discharge in a fluid such as water, including point-to-plane configuration, coaxial configuration, or surface treatment systems. Exemplary systems are shown in FIGS. 1A-1K. Suitable configurations, including those depicted in FIGS. 1A-1K, are a point-to-plane liquid phase corona vessel, a point-to-plane liquid phase corona vessel with an air gap, a single point-to-plane glow discharge vessel, a plane-to-plane glow discharge vessel, a multiple point-to-plane glow discharge vessel, a pinhole vessel, a ring electrode vessel, a point-to-point arc vessel, a wire-cylinder vessel, a gas-phase gliding arc over fluid surface, a gliding arc with fluid film and a gliding arc to fluid surface vessel.

The vessel facilitates mixing and accommodates the final plasma configuration. Incorporating mixing capabilities into the design of the vessel will enhance the plasma treatment, thereby resulting in successful inactivation of a larger population of microorganisms. The vessel may be designed for easy integration into existing water delivery systems. Compatibility of the design with existing water delivery systems may eliminate unnecessary piping, for example.

Many water treatment systems require batch treatment wherein water must be pumped into a treatment chamber for treatment and then subsequently pumped out of the chamber, after treatment. The present invention, however, allows for continuous flow, which provides a significant advantage over many prior art methods. However, the present invention can also be implemented in batch flow, if desired, particularly if it will be combined with other processes that may require batch flow or batch treatment.

The present invention can be implemented, for example, in a cooling tower with a pool of fluid located therein. One to twenty or more electrode pairs, each provided with a separate power supply, may be used in the cooling tower for generating plasma discharges. The fluid may optionally be mixed and, in some embodiments, mixing may be arranged by generating a reverse vortex flow in the fluid. Alternatively, mixing can be accomplished by other means such as one or more fluid jets located in or near the pool of fluid.

In another embodiment, the present invention may be implemented in a fluid treatment apparatus including in-line fluid treatment in a pipe carrying moving fluid. The fluid treatment apparatus is provided with at least two electrodes for generating a plasma discharge in said fluid, a fluid flow inlet and a fluid flow outlet to allow fluid to be passed through the pipe. Fluid treated by the pulsed plasma discharge may be subsequently passed through a filter for a second stage of treatment. The purpose of the second stage treatment with a filter is to remove dead microorganisms or any suspended particulates such as dust and calcium carbonate salts from the fluid.

In order to incorporate mixing into the vessel, a reverse vortex flow pattern may be utilized. This type of flow pattern is characterized by a tangential velocity component consisting of outer and inner regions exhibiting quasi-free and quasi-forced vortex flows, respectively. The axial velocity component flow is directed downward when occurring in the outer flow region and upward along the axis of the inner flow region. The radial velocity component is the smallest of the three components and is directed inward nearly everywhere.

Figure 2:
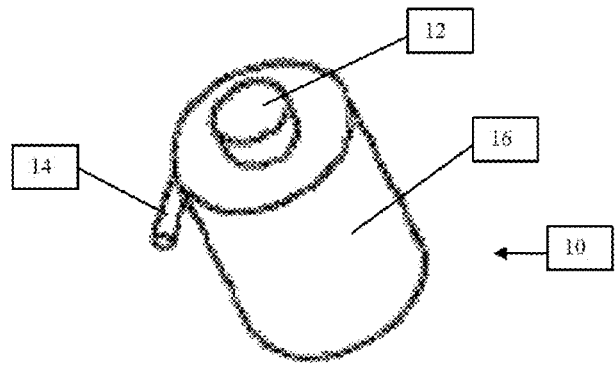
FIG. 2 is a perspective view of one embodiment of a vortex vessel which may be used to generate reverse vortex flow in accordance with the present invention.

As shown in FIG. 2, the vessel geometry of a vessel 10 includes a vessel 16, and may include a tangential inlet 14 with a top-mounted outlet 12, and is capable of supporting desired flow rates. The vessel volume may range from one to three liters, or more. The vessel should contain, or be manufactured from, a conductive material. An insulated enclosure is preferably provided to house the vessel.

Figure 3A:
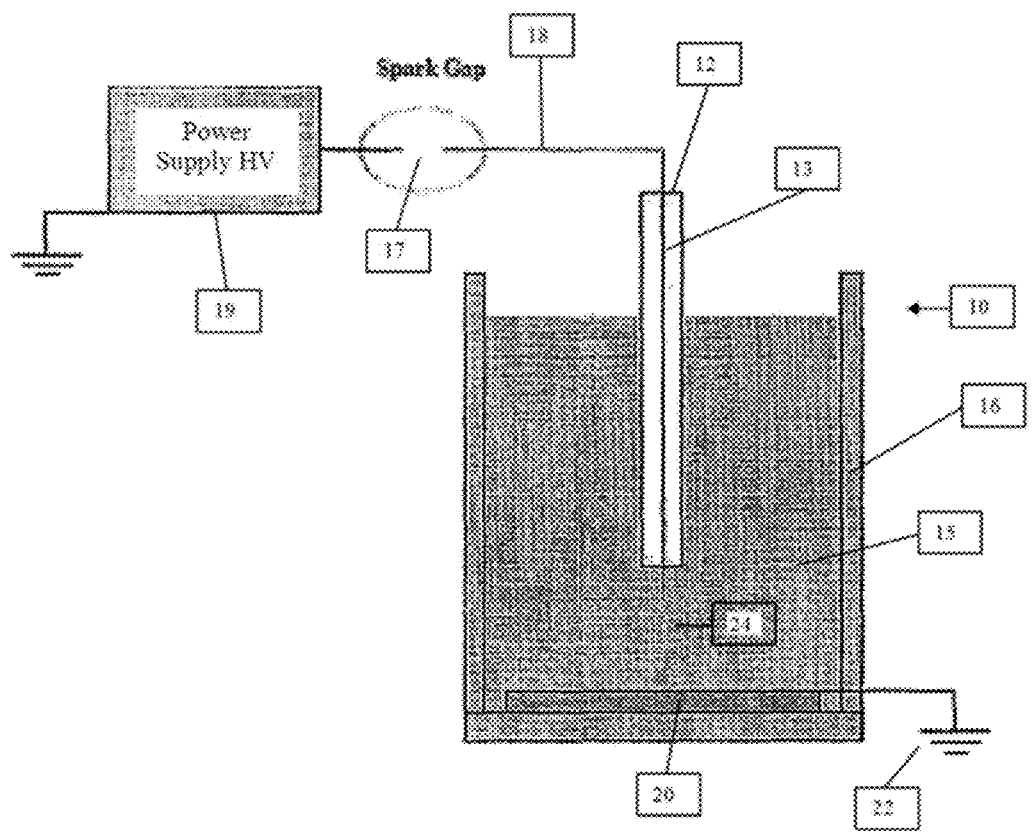
FIG. 3A is a schematic of a spark discharge vessel as used in Example 1.

As shown in FIG. 3A, the spark discharge vessel 10 is formed from a vessel 16 having a top-mounted outlet 12, a first electrode 13, connected by a electrical connection 18 to a high voltage source 19, and a second electrode 20 connected to an electrical source 22. The vessel 16 is filled with water 15. A spark gap 17 is provided in electrical connection 18 to high voltage source 19. The plasma gap 24 between the first and second electrodes is relatively small, preferably less than about one inch, to ensure production of discharge of the type which is between a pulsed corona discharge and a pulsed arc discharge. Specifically, a discharge having one or more of an operating frequency, peak current, peak voltage and voltage rise between the ranges of these parameters given for pulsed corona and pulsed arc discharges in Table 1 below, may be used in the present invention. A characterization of these types of plasma discharges are given in Table 1 below.

TABLE 1

Characteristics of Different Electrohydraulic Discharges[a]

| | Value | |
|---|---|---|
| Parameter | Pulsed Corona | Pulsed Arc |
| Operating frequency | $10^2$ to $10^3$ Hz | $10^{-2}$ to $10^{-3}$ Hz |
| Current (peak) | 10-$10^2$ A | $10^3$-$10^4$ A |
| Voltage (peak) | $10^4$-$10^6$ V | $10^3$-$10^4$ V |
| Voltage rise | $10^{-7}$-$10^{-9}$ s | $10^{-5}$-$10^{-6}$ s |
| Pressure wavegeneration | weak to moderate | strong |
| UV generation | weak to moderate | strong |

Table 1 is taken from Chang, J. S., et al., "Characteristics of Pulsed Arc Electrohydraulic Discharges and Their Application to Water Treatment," Res. *Rep Tokyo Denki Univ.*, 2002, 50, 1. More particularly, in one embodiment the discharge employed in the present invention is a spark discharge or a pulsed spark discharge. The spark discharge may have a pulse energy of 1-20 Joules.

The pulsed plasma discharge of the present invention can be generated by, for example, a high voltage pulsed power supply. An exemplary high voltage pulsed power supply may include a DC charger, a capacitor bank and a spark gap. The DC power supply may be driven by a solar panel as the power requirements for implementation of the invention are relatively small. One example of a spark gap generator is an apparatus which includes at least two electrodes in gas medium separated by a distance in the range 5-50 mm, approximately equal to the distance between electrodes in a liquid. One of the electrodes has a sharp tip configuration of a stainless wire, whereas the other electrode, preferably of metal, has a rounded or flat configuration and a much larger size compared to the size of the stainless wire of the first electrode tip.

Figure 3B:
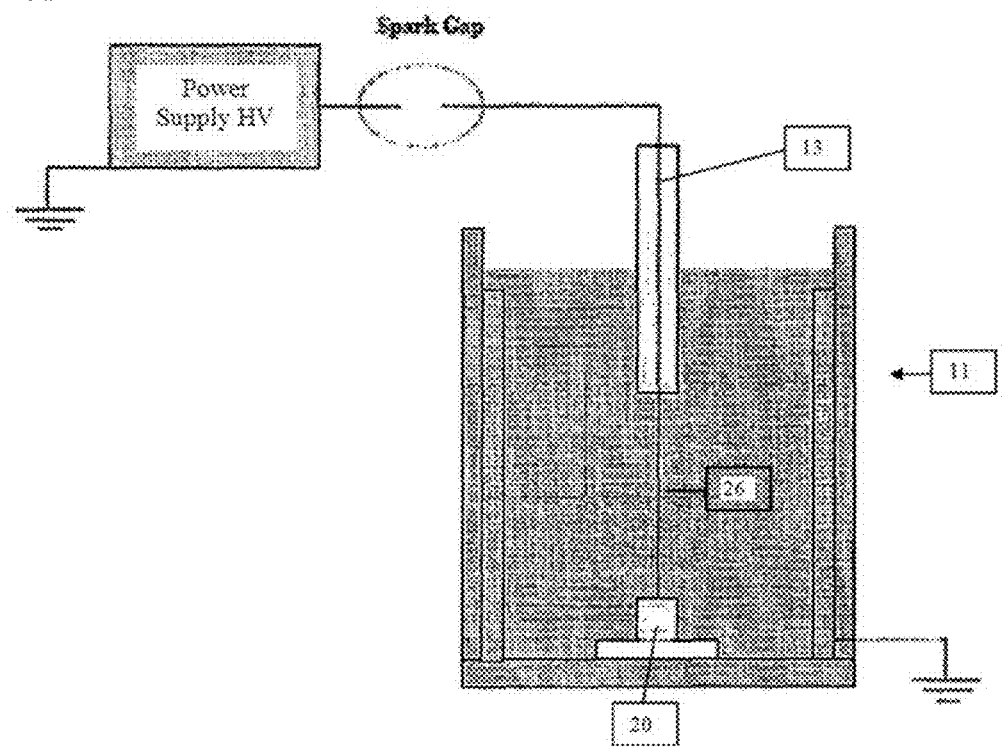
FIG. 3B is a schematic of a co-axial discharge vessel as used in Example 2.

In the co-axial discharge vessel 11, shown FIG. 3B, the gap 26 between the first electrode 13 and the second electrode 20 is relatively large, preferably more than about two inches, although in some cases a gap in excess of one inch may be sufficient, to ensure production of a corona discharge.

Figure 4:
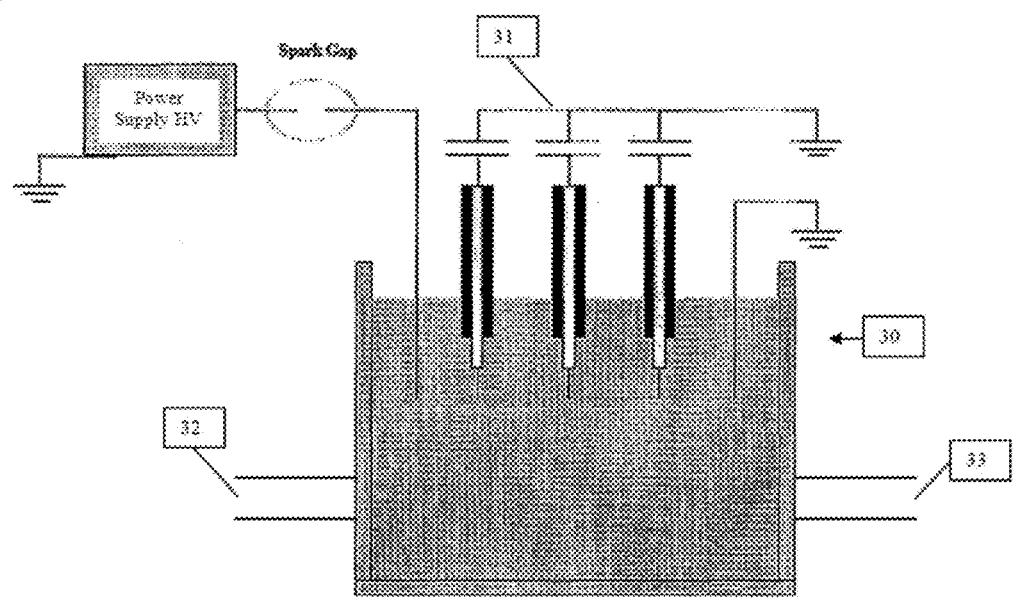
FIG. 4 is a schematic of the elongated spark configuration of Example 4.
Figure 5:
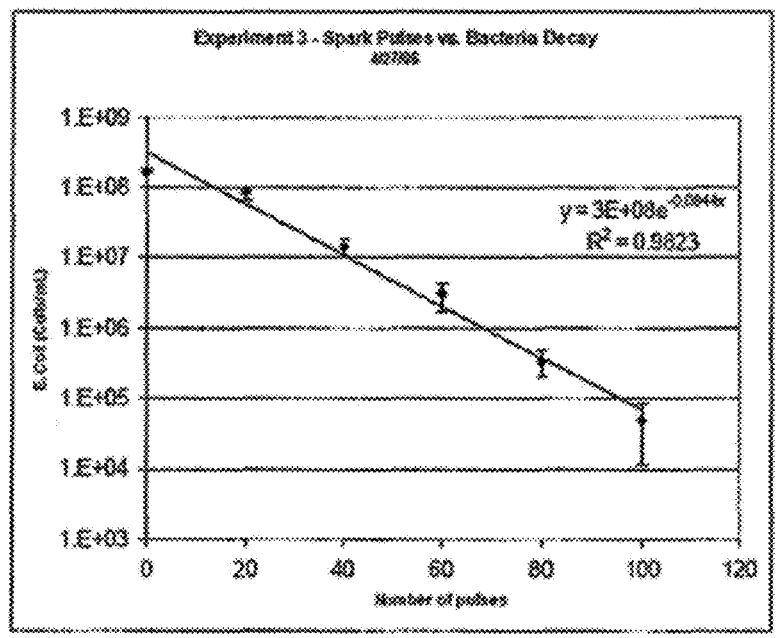
FIG. 5 is a graph of the spark pulses versus bacterial decay for the results of Table 2 of Example 1.
Figure 6:
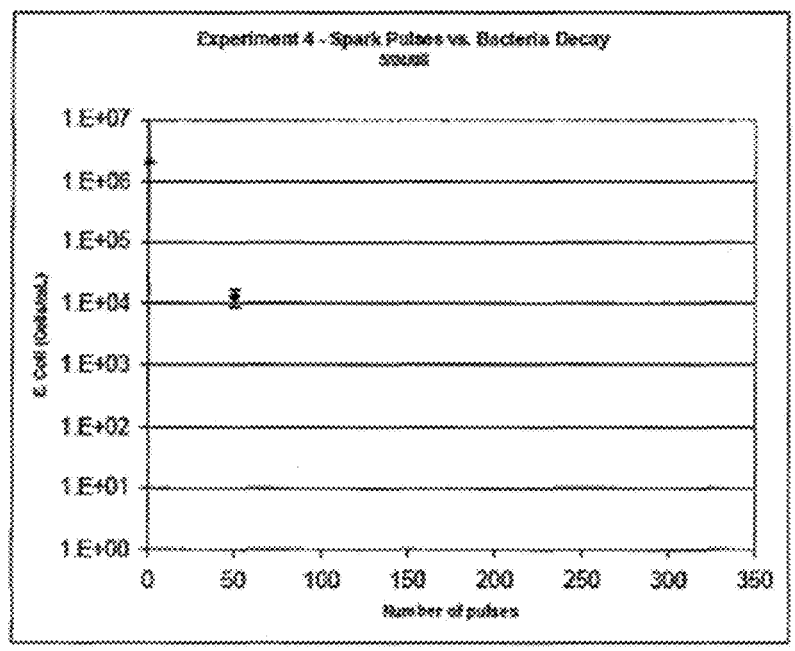
FIG. 6 is a graph of the spark pulses versus bacterial decay for the results of Table 3 of Example 1.
Figure 7:
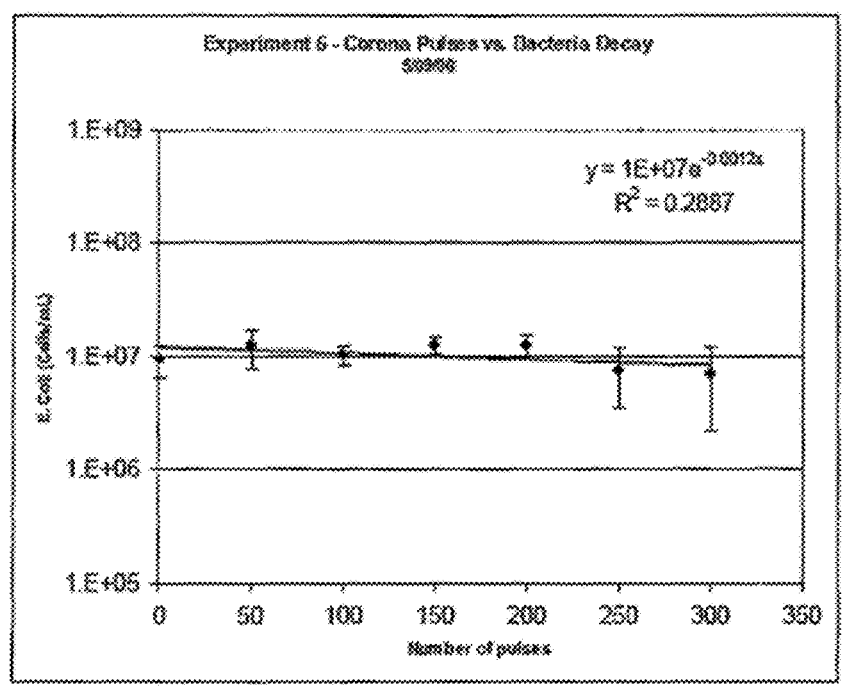
FIG. 7 is a graph of the corona pulses versus bacterial decay for the results of Table 4 of Example 2.
Figure 8:
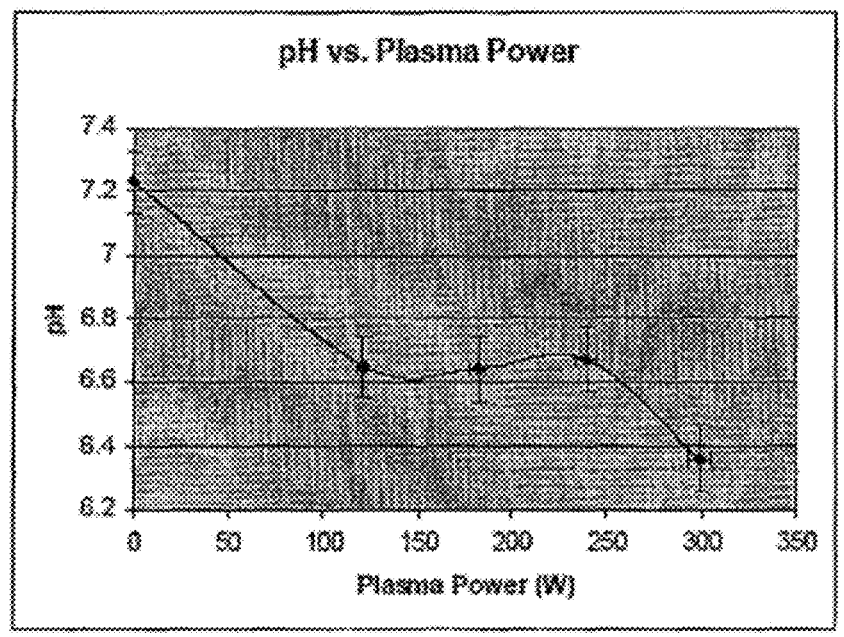
FIG. 8 is a graph of pH versus plasma power for the rotating gliding arc discharge system of Example 3.
Figure 9:
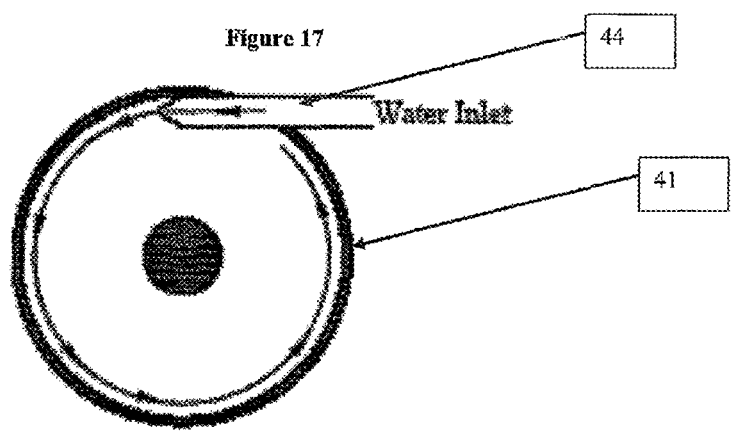
FIG. 9 is a top view of the rotating gliding arc vessel.

In the elongated spark vessel 30, shown in FIG. 4, the vessel 30 includes one set of three electrodes 31 but the system can easily be expanded to include more electrodes 31. Vessel 30 additionally includes a flow inlet 32 and a flow outlet 33. This vessel 30 provides an elongated spark discharge along the three electrodes 31. The spark plasma discharge generated in this elongated spark vessel 30 is the same type of discharge utilized in spark discharge vessel 10 and therefore will have similar inactivation characteristics as the spark discharge vessel 10. The electrodes 31 are manufactured from coaxial cable (RG-8/u) to create a series of high voltage capacitors, approximately 86 pico-Farad per three foot length of cable, that allow for the spark to be elongated between the electrodes. By varying the length of the cables and therefore the capacitance, or by implementing other capacitors or varying the distance between the electrodes, an elongated spark can be easily integrated into a variety of systems and applications FIG. 9 shows a rotating gliding arc vessel as employed in Example 3. A typical rotating gliding arc configuration used in gas flow vessels was utilized in this design in which a series of magnets were used to create the gliding arc. The arc rotates around the cylindrical vessel due to the magnetic and electrical forces. To utilize this arc discharge for water treatment, we introduce a stream of water through a nozzle 44 tangential to our main vessel cylinder 41 which acts as the cathode. This stream of water cascades in spiral down the inside of the vessel cylinder 41, completing a full revolution prior to entering the plasma region of the vessel, creating a thin film of water that is being exposed to the plasma arc discharge. After the aqueous solution has been treated by the gliding arc, it descends into specially designed water flow apparatus forming the base of the vessel and is expelled through two ports on either side of the water flow apparatus.

A vessel as shown in FIG. 2, including a vessel inlet diameter of 1.27 cm (0.5 inches) paired with an outlet diameter of 5.08 cm (2 inches) appears to be suitable for use in the present invention. The vessel body consists of an effective 12.7 cm (5 inch) diameter and an overall height of 15.24 cm (6 inches). Numerical analysis of fluid dynamics in this vessel was performed wherein the analyzed fluid was water at 25° C. having a density of 1000 kg/m$^3$ and a dynamic viscosity of 0.00089 kg/ms, subjected to a constant gravity of 9.81 m/s$^2$. A constant flow rate of 0.31545 L/s was utilized in conjunction with a constant inlet diameter of 1.27 cm, resulting in a calculated velocity of 2.49 m/s. As a result of the chosen inlet diameter, the flow environment was determined to be turbulent having a Reynolds number of approximately 35,390.

Accurate characterization of the resulting flow within the vessel was obtained through post-processing capabilities including generation of velocity vector, velocity contour, particle trace, and component velocity (radial, axial, and tangential) plots.

A vessel exhibiting reverse vortex flow characteristics was determined to provide the predictable mixing capabilities useful for effective fluid or water treatment by pulsed plasma discharges. Inlet and outlet dimensions were varied in order to facilitate thorough analysis of the subsequent effect on resulting flow patterns. Fluid progresses downward and away from the inlet causing drastic decreases in its velocity. The reverse vortex flow geometry provides useful characteristics for adequate plasma treatment of fluids such as water. Flow predictability and sufficient residence time associated with the determined nominal dimensions appear to increase both the effectiveness of the reverse vortex and the efficiency of plasma treatment. It is suggested that this flow scheme will increase the duration of treatment by plasma.

Alternatively, other conventional mixing apparatus may be employed. For example, a bar magnet may be used to mix the fluid. The bar magnet can be rotated using an external device, such as is commonly done in a laboratory. Fluid jets or other suitable mixing apparatus may also be employed and it is not necessary in all embodiments to generate a reverse vortex flow to obtain acceptable fluid treatment.

A spark gap generator may be utilized to create a pulsed power signal from a DC power source. Exemplary spark gap generators are depicted in FIG. 4.

A water treatment system may employ either a pulsed spark discharge or a pulsed corona discharge treatment. A water treatment system may also employ a gliding arc discharge system.

Example 1

Point-to-Plane Electrode Configuration

This example utilized a point to plane electrode configuration. Initial experiments included stainless steel and tungsten wire electrodes of varying diameters (0.01-0.007") with no insulation. Variance in the plasma from corona to spark discharge was observed to be dependent upon the gap distance measured from the anode to the grounded cathode. When the distance between the electrodes was small, the voltage would initiate a channel breakdown in water thus leading to a spark discharge. Conversely, when the distance between the electrodes increased and reached a critical distance, the plasma would cease being a spark discharge and a corona discharge would initiate.

The next step involved fabrication of electrodes that were both rigid and electrically insulated. This design included a stainless steel electrode (0.007") encased in silicone residing in a Teflon™ tube providing the necessary insulation for the electrodes. A stainless steel wire was chosen as the electrode due to its high melting temperature and relative stability at high pressure. The metal wire was placed inside the Teflon tube and held in place by silicone injected inside the tube. This assembly (the wire running down the middle of the Teflon™ tube and bonded with the Silicone) was placed inside a glass tube to add rigidity and dielectric strength to the electrode. So in the final configuration, the outer layer was a glass tube, the next layer was a Teflon™ tube, the next layer was the silicone bond and finally the center stainless steel electrode wire. This electrode configuration and rigidity enabled accurate distance calibrations to be made between the positive and grounded electrodes. The stainless steel electrode extended approximately 1/16 of an inch beyond the bottom of the glass tube, providing a region for spark discharge initiation. The critical distance between which spark discharge and corona discharge exists was observed to be approximately one inch between electrodes. Greater than one inch results in corona discharge, whereas less than one inch results in spark discharge.

Figure 10:
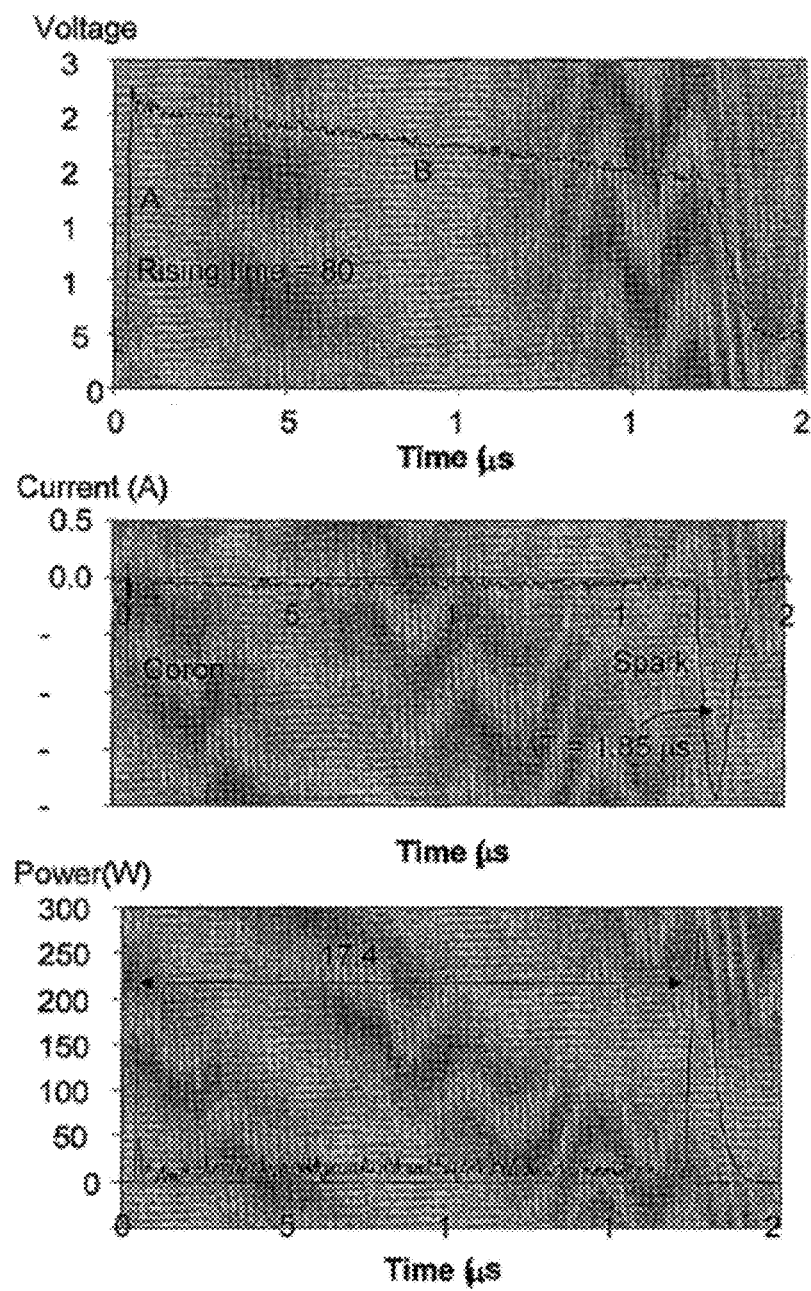
FIG. 10 presents voltage, current and power profiles measured using an oscilloscope during a typical pulsed spark test as described in Example 1.

FIG. 10 presents voltage, current and power profiles measured using an oscilloscope during a typical pulsed spark test. The initial steep rise in the voltage profile indicates the time moment of breakdown in the spark gap and streamer-like structure formation in the water, after which the voltage linearly decreased with time over the next 17 ρs due to electrolysis over the surface of a streamer channel, and spark channel formation (heating of the current channel) and then a sharp voltage drop and current peak because of spark. The rate of the voltage drop over time depends on the capacitance used in the test. The current and power profiles show the corresponding histories which show initially sharp peaks and then very gradual changes over the next 17·mu·s. The duration of the initial peak was measured to be approximately 70 ns. At t~17 ρs, there was a sudden drop in the voltage, indicating the onset of a spark or the moment of channel appearance, which was accompanied by sharp changes in both the current and power profiles. The duration of the spark was approximately 2 ρs, which was much longer than the duration of the corona.

Table 2 below shows bacterial concentrations following water treatment with the pulsed spark discharge of Example 1.

TABLE 2

| | | $10^{-2}$ | $10^{-3}$ | $10^{-4}$ | $10^{-5}$ | $10^{-6}$ | $10^{-7}$ | $10^{-8}$ | Cells/mL |
|---|---|---|---|---|---|---|---|---|---|
| | | | | Experiment 3A | | | | | |
| # of Pulses | 0 | — | — | — | — | 154 | 29 | 2 | 1.84E+06 |
| | 20 | — | — | — | — | 101 | 26 | 7 | 1.01E+06 |
| | 40 | — | — | — | 154 | 40 | 6 | 0 | 1.54E+07 |
| | 60 | — | — | 167 | 28 | 7 | 2 | 2 | 1.67E+06 |
| | 80 | — | 210 | 45 | 6 | 0 | 0 | 0 | 2.10E+05 |
| | 100 | — | 93 | 12 | — | — | — | — | 9.30E+04 |
| | | | | Experiment 3B | | | | | |
| # of Pulses | 0 | — | — | — | — | 175 | 34 | 10 | 1.76E+06 |
| | 20 | — | — | — | — | 74 | 18 | 5 | 7.40E+07 |
| | 40 | — | — | — | 101 | 27 | 11 | 5 | 1.01E+07 |
| | 60 | — | — | — | 42 | 6 | 3 | — | 4.20E+06 |
| | 80 | — | — | 46 | 17 | 3 | — | — | 4.60E+05 |
| | 100 | 243 | 36 | 7 | — | — | — | — | 2.43E+04 |
| | | | | Experiment 3C | | | | | |
| # of Pulses | 0 | — | — | — | — | 160 | 27 | 12 | 1.96E+08 |
| | 20 | — | — | — | — | — | — | — | |
| | 40 | — | — | — | 185 | 30 | 11 | 5 | 0.00E+07 |
| | 60 | — | — | — | 32 | 5 | 7 | — | 0.00E+06 |
| | 80 | — | — | 33 | 7 | 6 | — | — | 0.00E+05 |
| | 100 | 305 | 23 | 3 | — | — | — | — | 0.00E+04 |

A second set of experiments was performed using the configuration of Example 1. The results are given in Table 3 below.

TABLE 3

| | | $10^{-2}$ | $10^{-3}$ | $10^{-4}$ | $10^{-5}$ | $10^{-6}$ | $10^{-7}$ | $10^{-8}$ | Cells/mL |
|---|---|---|---|---|---|---|---|---|---|
| | | | | Experiment 4A | | | | | |
| # of Pulses | 0 | TNC | TNC | 205 | 26 | 4 | 1 | 0 | 2.05E+06 |
| | 50 | 87 | 9 | 1 | 2 | 1 | 1 | 1 | 8.70E+03 |
| | 100 | 0 | 1 | 1 | 2 | 1 | 0 | 0 | 0.00E+00 |
| | 150 | 0 | 2 | 0 | 0 | 2 | 0 | 2 | 0.00E+00 |
| | 200 | 2 | 0 | 0 | 1 | 3 | 0 | 1 | 0.00E+00 |
| | 250 | 0 | 1 | 1 | 2 | 3 | 1 | 2 | 0.00E+00 |
| | 300 | 3 | 0 | 0 | 1 | 0 | 1 | 1 | 0.00E+00 |
| | | | | Experiment 4B | | | | | |
| # of Pulses | 0 | TNC | TNC | 204 | 31 | 11 | 1 | 0 | 2.04E+06 |
| | 50 | 152 | 20 | 5 | 4 | 1 | 1 | 1 | 1.52E+04 |
| | 100 | 1 | 1 | 1 | 2 | 1 | 1 | 0 | 0.00E+00 |
| | 150 | 3 | 2 | 0 | 1 | 0 | 1 | 1 | 0.00E+00 |
| | 200 | 2 | 0 | 0 | 1 | 0 | 0 | 0 | 0.00E+00 |
| | 250 | 2 | 2 | 0 | 1 | 0 | 0 | 2 | 0.00E+00 |
| | 300 | 1 | 0 | 2 | 1 | 0 | 1 | 0 | 0.00E+00 |
| | | | | Experiment 4C | | | | | |
| # of Pulses | 0 | TNC | TNC | 196 | 21 | 12 | 14 | 0 | 1.96E+06 |
| | 50 | 185 | 24 | 0 | 5 | 4 | 0 | 3 | 1.58E+04 |
| | 100 | 0 | 3 | 1 | 1 | 3 | 0 | 0 | 0.00E+00 |
| | 150 | 3 | 2 | 5 | 0 | 3 | 0 | 3 | 0.00E+00 |
| | 200 | 1 | 2 | 4 | 1 | 0 | 0 | 2 | 0.00E+00 |
| | 250 | 3 | 2 | 3 | 0 | 1 | 1 | 1 | 0.00E+00 |
| | 300 | 3 | 2 | 0 | 1 | 2 | 4 | 2 | 0.00E+00 |

Example 2

Co-Axial Electrode Configuration

A co-axial electrode geometry was employed in this example. The co-axial geometry was utilized to initiate corona plasma discharge similar to what was seen in the point-to-plane configuration of Example 1. The difference was that the discharge would be along the length of the wire (i.e. co-axial) as opposed to a spark discharge which occurred at the tip of the wire, as in Example 1. From initial experimentation, it was observed that the radial distance from anode to grounded cathode had to be greater than two inches in order to avoid channel breakdown.

A 1200 ml autoclavable container was selected and lined with a stainless steel wire mesh to form the co-axial configuration. The electrode encasement was constructed similar to that of Example 1; however, in this setup the electrode was allowed to extend approximately two inches beyond the silicon encased Teflon™ tubing. The elongated end of the electrode was fixed through a mating glass tube embedded in a Teflon™ base. This enabled the electrode to run co-axial to the wire mesh circumventing the container. In order to focus the corona discharge along the length of the wire, the glass rods should be extended about ¼ of an inch past the end of the Teflon™ tubing. The results are given in Table 4 below.

TABLE 4

| | | $10^{-2}$ | $10^{-3}$ | $10^{-4}$ | $10^{-5}$ | $10^{-6}$ | $10^{-7}$ | $10^{-8}$ | Cells/mL |
|---|---|---|---|---|---|---|---|---|---|
| | | | | Experiment 5A | | | | | |
| # of Pulses | 0 | — | — | — | 73 | 3 | 0 | 0 | 7.30E+06 |
| | 50 | — | — | — | 151 | 6 | 3 | 0 | 1.51E+07 |
| | 100 | — | — | — | 115 | 9 | 3 | 1 | 1.15E+07 |
| | 150 | — | — | — | 117 | 12 | 1 | 0 | 1.12E+07 |
| | 200 | — | — | — | 142 | 14 | 0 | 0 | 1.42E+07 |
| | 250 | — | — | — | 28 | 14 | 1 | 0 | 2.80E+06 |
| | 300 | — | — | — | 15 | 2 | 4 | 0 | 1.50E+06 |
| | | | | Experiment 5B | | | | | |
| # of Pulses | 0 | — | — | — | — | 20 | 2 | 0 | — |
| | 50 | — | — | — | 71 | 11 | 2 | 0 | 7.10E+06 |
| | 100 | — | — | — | 80 | 6 | 1 | 0 | 8.00E+06 |
| | 150 | — | — | — | 141 | 15 | 3 | 0 | 1.41E+07 |
| | 200 | — | — | — | 93 | 5 | 1 | 1 | 9.30E+06 |
| | 250 | — | — | — | 99 | 12 | 0 | 0 | 9.90E+06 |
| | 300 | — | — | — | 105 | 6 | 4 | 0 | 1.50E+07 |
| | | | | Experiment 5C | | | | | |
| # of Pulses | 0 | — | — | — | 117 | 15 | 3 | 0 | 1.17E+07 |
| | 50 | — | — | — | 154 | 23 | 1 | 1 | 15400000 |
| | 100 | — | — | — | 116 | 16 | 2 | 0 | 1.16E+07 |
| | 150 | — | — | — | — | — | — | — | |
| | 200 | — | — | — | 143 | 15 | 1 | 1 | 1.43E+07 |
| | 250 | — | — | — | 100 | 13 | 1 | 0 | 1.00E+07 |
| | 300 | — | — | — | 91 | 6 | 0 | 0 | 9.10E+06 |

Example 3

Rotating Gliding Arc Configuration

The third example employed a rotating gliding arc configuration. This system utilizes a constant DC voltage which creates an arc discharge. The arc discharge is a constant stream of electrons and ions moving between electrodes across a set distance. The power supply is different from those of Examples 1-2 because it utilizes a DC discharge, rather than a pulsed discharge. To optimize the arc discharge, a series of magnets were used to create the gliding arc design. The arc rotates around the cylindrical vessel due to the magnetic and electrical forces. The bacteria laden solution is introduced into the vessel near the top of the cylinder and flows tangentially along the wall, creating a complete circle prior to entering the plasma region. After the solution has been treated by the gliding arc, it descends to the bottom of the apparatus and is expelled through two ports on either side of the base.

TABLE 5

| Voltage Plasma (kV) | Power (W) | pH | T (° C.) |
|---|---|---|---|
| 0 | 0 | 7.23 | 23.8 |
| 4 | 120.7 | 6.65 | 24.6 |
| 6 | 182 | 6.64 | 25.2 |
| 8 | 239 | 6.67 | 25.5 |
| 10 | 299 | 6.36 | 25.4 |

TABLE 6

| | | $10^{-2}$ | $10^{-3}$ | $10^{-4}$ | $10^{-5}$ | $10^{-6}$ | $10^{-7}$ | Cells/mL |
|---|---|---|---|---|---|---|---|---|
| | | | | Experiment 7A | | | | |
| Power (W) | 0 | — | — | 271 | 32 | 2 | 0 | 2.71E+06 |
| | 120.7 | 0 | 0 | 0 | 0 | 0 | 0 | 0.00E+00 |
| | 182 | 0 | 0 | 0 | 0 | 0 | 0 | 0.00E+00 |
| | 239 | 0 | 0 | 0 | 0 | 0 | 0 | 0.00E+00 |
| | 299 | 0 | 0 | 0 | 0 | 0 | 0 | 0.00E+00 |
| | | | | Experiment 7B | | | | |
| Power (W) | 0 | — | — | — | 36 | 1 | 0 | 3.60E+06 |
| | 120.7 | 0 | 0 | 0 | 0 | 0 | 0 | 0.00E+00 |
| | 182 | 0 | 0 | 0 | 0 | 0 | 0 | 0.00E+00 |
| | 239 | 0 | 0 | 0 | 0 | 0 | 0 | 0.00E+00 |
| | 299 | 0 | 0 | 0 | 0 | 0 | 0 | 0.00E+00 |
| | | | | Experiment 7C | | | | |
| Power (W) | 0 | 0 | 0 | 279 | 27 | 1 | 0 | 2.79E+06 |
| | 120.7 | 0 | 0 | 0 | 0 | 0 | 0 | 0.00E+00 |
| | 182 | 0 | 0 | 0 | 0 | 0 | 0 | 0.00E+00 |
| | 239 | 0 | 0 | 0 | 0 | 0 | 0 | 0.00E+00 |
| | 299 | 0 | 0 | 0 | 0 | 0 | 0 | 0.00E+00 |

Example 4

Elongated Spark Configuration

Long spark ignition is the process of taking a single spark and elongating it through a series of capacitors. The benefit of this system is that it takes a standard spark discharge and utilizes it in a novel water sterilization technology. Long spark has a significant advantage over increasing the spark gap distance of the standard system. In order to increase the spark gap distance, the standard system would require increased capacitances and increased voltage in order to initiate breakdown. Long spark technology only requires individual capacitors per adjacent electrode, thus eliminating the need for increased supply voltage. The system of this example utilizes a length of coaxial cable (RG-8/u) to create a series of high voltage capacitors. The capacitance of the cable was determined to be 28.5 pico-Farad per foot (pF/ft), with each cable measuring approximately three feet. The discharge was sustained over three of the capacitors with an overall spark length of approximately one inch.

TABLE 7

| Plasma Discharge in Water Comparison Chart | | | | |
|---|---|---|---|---|
| | Pulsed Arc Discharge | Pulsed Spark Discharge | Pulsed Corona Discharge (min) | Pulsed Corona Discharge (max) |
| Energy per Liter for 1 log reduction in *E. Coli* (J/L) | 860 | 77 | 30000 | 150000 |
| Power requirement for household water consumption at 6 gpm (kW) | 0.326 | 0.029 | 11.4 | 26.8 |
| Power requirement for village water consumption at 1000 gpm (kW) | 54.3 | 4.9 | 1892.7 | 9463.5 |
| Efficiency of power supply required | Excellent | Excellent | Poor | Poor |
| Maximum Power available in small power system (4' × 4' × 4' overall system size) (kW) | 30 | 10 | 0.3 | 0.3 |
| Maximum Water throughput based on Maximum power (gpm) | 553 | 2058 | 0.16 | 0.03 |
| Central lethal biological agent of discharge | UV and Chemical Radicals | UV | Chemical Radicals (OH, $H_3O^+$, $H_2O_2$) | Chemical Radicals (OH, $H_3O^+$, $H_2O_2$) |

Above is a chart comparing the different plasma discharges found in plasma-based water treatment methods.

The present invention allows selection of optimal pulsed discharge parameters to generate a spark discharge that is between a pulsed corona discharge and a pulsed arc discharge that allows a significant reduction in the energy cost of treatment.

While the invention has been described in detail and with reference to specific embodiments thereof, it will be apparent to one skilled in the art that various changes and modifications can be made therein without departing from the spirit and scope thereof.

What is claimed is:

1. A water treatment apparatus comprising:
   (a) a vessel capable of containing water, said vessel comprising a water flow inlet and water flow outlet configured to allow the water to pass through the vessel; and
   (b) at least three electrode modules for generating an elongated spark discharge in said fluid within the vessel, wherein each electrode module comprises an electrode and an associated capacitor configured in electrical series with one another, and each electrode module is in parallel arrangement with one another.

2. The water treatment apparatus of claim 1, comprising a reverse vortex flow generator for generating a reverse vortex flow in said vessel.

3. The water treatment apparatus of claim 1, comprising a mixer for mixing fluid in said vessel.

4. The water treatment apparatus of claim 1, further comprising a high voltage pulsed power supply.

5. The water treatment apparatus of claim 4, wherein the pulsed power supply comprises a DC charger, a capacitor bank and a spark gap.

6. A water treatment apparatus comprising:
   (a) at least three electrode modules for generating an elongated spark discharge in a vessel capable of containing a pool of water, wherein each electrode module comprises an electrode and an associated capacitor configured in electrical series with one another, and each electrode is in parallel arrangement with one another; and
   (b) a fluid flow device configured to provide contact between said pool of water and said elongated spark discharge.

7. The water treatment apparatus of claim 6, further comprising one or more water jets for mixing the water in said pool of water.

8. The water treatment apparatus of claim 6, further comprising a mixing apparatus for generating a reverse vortex flow in said pool of water.

9. The water treatment apparatus of claim 6, further comprising a high voltage pulsed power supply.

10. The water treatment apparatus of claim 9, wherein the pulsed power supply comprises a DC charger, a capacitor bank and a spark gap.

11. A water treatment apparatus comprising a pipe carrying a volume of moving water, said pipe being equipped with at least three electrode modules for generating an elongated spark discharge in said volume of moving water, a water flow inlet and a water flow outlet to allow the water to be passed through said pipe, wherein each electrode module comprises an electrode and an associated capacitor configured in electrical series with one another, and each electrode module being in parallel arrangement with one another.

12. The water treatment apparatus of claim 11, further comprising a filter positioned in the pipe downstream from the at least three electrode modules.

13. The water treatment apparatus of claim 11, further comprising a high voltage pulsed power supply.

14. The water treatment apparatus of claim 13, wherein the pulsed power supply comprises a DC charger, a capacitor bank and a spark gap.

* * * * *